May 9, 1933.   M. G. COUPEAU ET AL   1,908,407
PROCESS FOR THE REMOVAL OF ALCOHOL FROM WINE, CIDER,
BEER, AND OTHER ALCOHOLIC PRODUCTS
Filed July 23, 1930
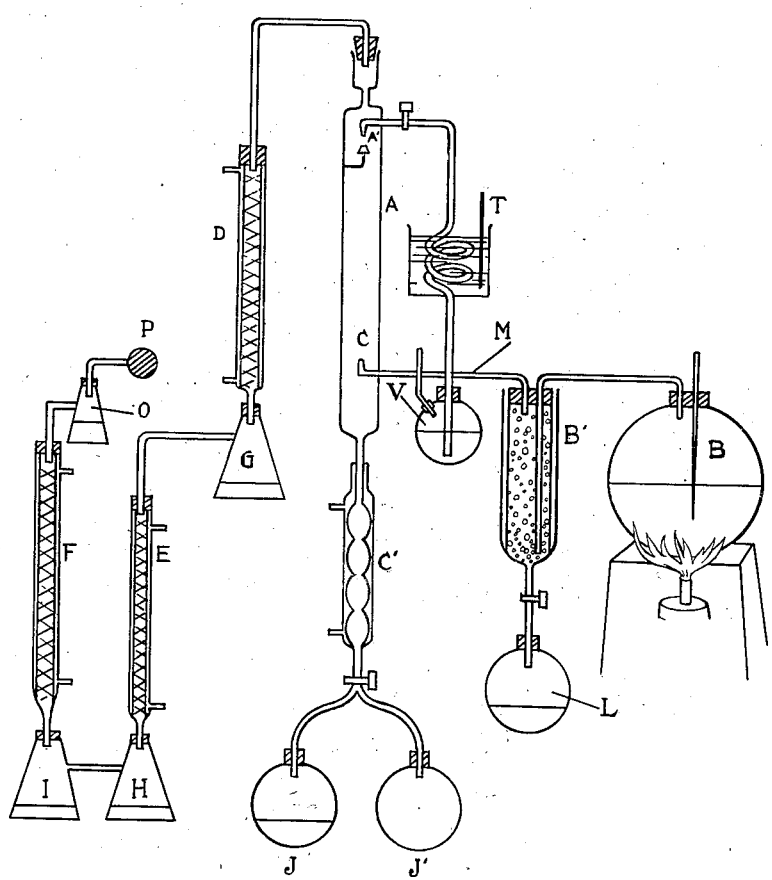
INVENTORS.
Marc Gustave Coupeau.
Maurice Delaville
By
ATTORNEY.

Patented May 9, 1933

1,908,407

UNITED STATES PATENT OFFICE

MARC GUSTAVE COUPEAU, OF PARIS, AND MAURICE DELAVILLE, OF ST.-MAURICE, FRANCE, ASSIGNORS OF ONE-THIRD TO ANDRÉ CORNILLAC, OF PARIS, FRANCE

PROCESS FOR THE REMOVAL OF ALCOHOL FROM WINE, CIDER, BEER, AND OTHER ALCOHOLIC PRODUCTS

Application filed July 23, 1930, Serial No. 469,982, and in France June 25, 1930.

The present invention relates to a process for removing alcohol from wine or other liquids containing alcohol, and a plant by which the said process may be carried into effect.

The said process is as follows.

It commences with the removal of the olfactory and gustatory elements of the liquid undertreatment, that is, the essential oils, ethers, etc. by agitating the liquid in the presence of a suitable quantity of neutral and odorless paraffin oil, which has the property of taking up these elements without dissolving any alcohol. After standing for the proper time, the liquid is decanted in order to remove the deodorized alcoholic liquid from the paraffin, which latter is set aside for a treatment, as will be further stated, for the recovery of the olfactory and gustatory elements, which will be finally incorporated into the liquid from which the alcohol has been removed.

The deodorized alcoholic liquid is then subjected to an alcohol-removing treatment in which the alcohol is drawn off by water vapor, operating in a vacuum and at low temperature. For this purpose the liquid, which has been preferably heated by a heating device to a temperature substantially equal to that of the water vapor employed, or for instance to 30° C., is admitted in a finely atomized state into the top of a suitable chamber in which a vacuum is maintained. The minute particles of the liquid fall down and encounter on their descent a rising current of water vapor which draws with it the alcohol, and is then condensed with the alcohol in a suitable recipient, whilst the liquid from which the alcohol has been removed is collected downwards. The advantage obtained by preliminarily raising the liquid from which the alcohol is to be removed to a temperature substantially equal to the temperature attained (according to the degree of the vacuum) by the water vapor drawing with it the alcohol, is due to the fact that this avoids all condensation of this water vapor such as would take place if this vapor came into contact with colder drops, thus preventing all dilution of the liquid under treatment.

On the other hand, the paraffin oil used in the first operation is cold treated in order to remove the substances it contains. These substances are collected and are finally incorporated again into the liquid from which the alcohol has been removed.

Thus the resulting product contains absolutely all of the elements of the original alcoholic liquid, except the alcohol. Since on the other hand all the operations have been performed at low temperatures and in a vacuum, and since the treated liquid has at no time during the removal of the alcohol been in contact with heated walls, and as the alcohol has been removed by entraining it by water vapor at the same temperature as the liquid while the treated liquid has at no time been heated to its own boiling point, and since on the other hand, as soon as the alcohol has been brought over by the vapor, the liquid freed from alcohol is reduced to its initial temperature by cooling means, even the most fragile elements will have suffered no alteration, and the reconstituted liquid possesses (except for the removed alcohol) all of the olfactory and gustatory properties of the original liquid.

The accompanying drawing shows by way of example a plant for the removal of alcohol from wine that has been preliminarily deodorized and for the separation of the different elements; herein the apparatus are diagrammatically indicated rather in the form of laboratory apparatus, but they may have any suitable construction for manufacturing purposes.

A vacuum is produced and maintained in a chamber A by a vacuum pump P; the wine which is contained in the vessel V and is preferably slightly heated to a temperature near that of the water vapor to be used for entraining the alcohol, for instance by means of a heating worm T, is withdrawn by the vacuum and is sprayed by the injector A' mounted at the upper part of the chamber A. On the other hand, water vapor at a low temperature, and preferably dried, is supplied at the lower part of said chamber by means of the injector C; it is herein supposed by way of example that the water vapor is obtained by heating the water in a vessel B from which the vapor proceeds into a dryer B'; the condensed water descends into a collecting recipient L and the dry vapor flows through the pipe M to the injector C.

The minute drops of wine sprayed at A' descend and thus meet with a contrary current of water vapor; this latter draws with it the alcohol and becomes condensed together with the alcohol in the coolers D—E, being collected by the fractional method in vessels G—H; the wine freed from its alcohol proceeds into a recipient C' and is collected in one or the other of the vessels J—J'. Between the vacuum pump P and the vessel H serving to collect the second distillate, is mounted a vessel I followed by a cooler F and a like vessel O, for arresting the last traces of condensed liquid.

The treatment of the paraffin employed in the first operation, in order to restore the essences it contains, may be effected in various ways, for instance by distillation, but preferably by a cold process or at low temperature by the use of an auxiliary liquid or gaseous solvent, or by entraining by means of an apparatus resembling the one described.

Obviously, the different accessory features of the process, as well as the disposition of the several devices of the plant may be varied without departing from the spirit of the invention.

We claim:

1. Process for the treatment of alcoholic liquids, such as wines, containing gustative and olfactive constituents in a non-gaseous state, consisting in cold extracting the said constituents from the liquid before any heating, by means of a liquid solvent, in treating the thus deodorized liquid for the removal of the alcohol therefrom, in cold separating the said olfactive and gustative constituents from their first solvent by a second solvent which is not prejudicial to the final product, and in reincorporating the said constituents together with their second solvent into the liquid which has been freed from the alcohol.

2. Process for the treatment of alcoholic liquids, such as wines, containing gustative and olfactive constituents in a non-gaseous state, consisting in cold extracting the said constituents from the liquid before any heating, by means of a liquid solvent, in treating the thus deodorized liquid for the removal of the alcohol therefrom, in cold separating the said gustative and olfactive constituents from their first solvent by means of carbonic acid gas by which they are dissolved, and in reincorporating the said constituents together with their second solvent into the liquid which has been freed from the alcohol.

3. Process for the treatment of alcoholic liquids, such as wines, containing olfactive and gustative constituents in a non-gaseous state, consisting in cold extracting the said constituents from the liquid before any heating, by means of paraffin oil, in treating the thus deodorized liquid for the removal of the alcohol therefrom, in cold separating the said gustative and olfactive constituents from the paraffin oil by a second solvent which is not prejudicial to the final product, and in reincorporating the said constituents together with their second solvent into the liquid which has been freed from the alcohol.

4. Process for the treatment of alcoholic liquids, such as wines, containing gustative and olfactive constituents in a non-gaseous state, consisting in cold extracting the said constituents from the liquid before any heating, by means of a liquid solvent, in finely spraying the thus deodorized liquid from the top of a chamber in which a vacuum is produced, and in which the minute liquid drops descend against a rising current of steam drawing with it the alcohol, in cold separating the said gustative and olfactive constituents from their first solvent by a second solvent which is not prejudicial to the final product, and in reincorporating the said constituents into the liquid which has been freed from the alcohol.

5. Process for the treatment of alcoholic liquids, such as wines, containing gustative and olfactive constituents in a non-gaseous state, which consists in cold extracting the said constituents from the liquid before any heating, by means of a liquid solvent, finely spraying the thus deodorized liquid from the top of a chamber in which a vacuum is produced, and in which the minute liquid drops descend against a rising current of steam having substantially the same temperature as the liquid which is accordingly heated, and drawing with it the alcohol, raising the liquid thus deodorized to a temperature substantially equal to that of said current of steam in cold separating the said gustative and olfactive constituents from their first solvent by a second solvent which is not prejudicial to the final product, and in reincorporating the said constituents into the liquid which has been freed from the alcohol.

6. Process for the treatment of alcoholic liquids, such as wines, containing gustative and olfactive constituents in a non-gaseous state, which consists in cold extracting the said constituents from the liquid before any heating, by means of paraffin oil, finely spraying the said liquid from the top of a chamber in which a vacuum is produced, and in which the minute liquid drops descend against a rising current of steam having substantially the same temperature as the liquid which is accordingly heated, and drawing with it the alcohol, raising the liquid thus deodorized to a temperature substantially equal to that of said current of steam in cold separating the said gustative and olfactive constituents from the said paraffin oil by means of carbonic acid gas by which the said oil is dissolved, and in reincorporating the said constituents into the liquid which has been freed from the alcohol.

In testimony whereof we have signed this specification.

MARC GUSTAVE COUPEAU.
MAURICE DELAVILLE.